(12) United States Patent
Zhu et al.

(10) Patent No.: US 9,408,142 B2
(45) Date of Patent: Aug. 2, 2016

(54) POWER SAVING AND DEVICE TRAFFIC OFFLOAD

(71) Applicant: Intel Corporation, Santa Clara, CA (US)

(72) Inventors: Jing Zhu, Portland, OR (US); Satish Chandra Jha, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 140 days.

(21) Appl. No.: 14/227,943

(22) Filed: Mar. 27, 2014

(65) Prior Publication Data

US 2015/0282067 A1 Oct. 1, 2015

(51) Int. Cl.
| | |
|---|---|
| *G08C 17/00* | (2006.01) |
| *H04W 52/02* | (2009.01) |
| *H04L 1/00* | (2006.01) |
| *H04W 28/08* | (2009.01) |
| *H04W 48/00* | (2009.01) |
| *H04W 36/00* | (2009.01) |
| *H04W 84/12* | (2009.01) |

(52) U.S. Cl.
CPC ............. *H04W 52/0206* (2013.01); *H04L 1/00* (2013.01); *H04W 28/08* (2013.01); *H04W 36/0066* (2013.01); *H04W 48/00* (2013.01); *H04W 84/12* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2010/0009682 A1* | 1/2010 | Iwamura | H04W 36/06 455/436 |
| 2013/0201919 A1* | 8/2013 | Bai | H04W 68/02 370/328 |
| 2014/0050086 A1 | 2/2014 | Himayat et al. | |

FOREIGN PATENT DOCUMENTS

| | | |
|---|---|---|
| WO | WO-2012116252 A2 | 8/2012 |
| WO | WO-2013100629 A1 | 7/2013 |
| WO | WO-2015148449 A1 | 10/2015 |

OTHER PUBLICATIONS

"International Application Serial No. PCT/US2015/022156, International Search Report mailed Jun. 29, 2015", 4 pgs.
"International Application Serial No. PCT/US2015/022156, Written Opinion mailed Jun. 29, 2015", 4 pgs.
"RAN rules and traffic steering", R2-140688, 3GPP TSG-RAN WG2 #85, Prague, Czech Republic, (Feb. 2014), 2 pgs.

(Continued)

*Primary Examiner* — Minh-Trang Nguyen
(74) *Attorney, Agent, or Firm* — Schwegman Lundberg & Woessner, P.A.

(57) ABSTRACT

Generally discussed herein are systems, apparatuses, and techniques that can offload UE traffic to a WLAN. According to an example a base station can include a transceiver configured to (1) transmit, to a UE, a first control packet to move U-Plane traffic of the UE to a WLAN or (2) receive, from the UE, a second control packet acknowledging that the U-Plane traffic of the UE is to be moved to the WLAN, or (3) transmit Control Plane (C-Plane) traffic to the UE while no U-Plane traffic of the UE is being transmitted to the UE by the transceiver. The base station can include circuitry to route U-Plane traffic of the UE to the WLAN in response to the transceiver receiving the second control packet.

18 Claims, 3 Drawing Sheets

(56) References Cited

OTHER PUBLICATIONS

"WLAN/3GPP Radio interworking—Architecture and overview", Ericsson R2-140599, 3GPP TSG-RAN WG2 #85, Prague, Czech Republic, (Feb. 2014), 3 pgs.

Akhtar, Nadeem, "LTE-WLAN Interworking: 3GPP Release-12 Perspective", Centre of Excellence in Wireless Technology, Chennai IEEE Standards Workshop on Last Mile Connectivity, (Jul. 31, 2013), 20 pgs.

* cited by examiner

POWER SAVING AND DEVICE TRAFFIC OFFLOAD

TECHNICAL FIELD

Examples generally relate to device or cellular network traffic offload or power savings. More specifically, examples relate to offloading traffic while maintaining a cellular network link connection or configuring a cellular network radio of the device to save power.

BACKGROUND

Currently, device power saving mechanisms and UpLink (UL) radio resource allocation for a Scheduling Request (SR) are not optimized for a Wireless Local Area Network (WLAN) offloading case.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Examples in this disclosure relate generally to device or cellular network traffic offload or power savings. More specifically, examples relate to offloading traffic while maintaining a cellular network radio link connection or configuring a cellular network radio of the device.

One or more embodiments of the disclosure can improve device power savings for a cellular network (e.g., a Long Term Evolution (LTE) network) to WLAN (e.g., Wi-Fi) device traffic offload scenario. One or more embodiments of the disclosure can maintain an upper bound on the WLAN to cellular network (or vice versa) handover delay time. Such an upper bound can be important for a delay-sensitive application (e.g., video conference, Voice over Internet Protocol (VoIP), video game playing, or the like).

In Third Generation Partnership Project (3GPP) Rel. 12, there is a study item called "Study on UMTS/LTE WLAN/3GPP Radio Interworking" which focuses on techniques to offload cellular device traffic to WLAN. Offloading LTE traffic to WLAN can have a benefit like increasing the system (e.g., cellular network, WLAN, or a combination thereof) capacity to satisfy a device traffic demand or reducing a traffic load on the cellular network, among other benefits.

An interworking of cellular network and WLAN can make saving power on a cellular network device (e.g., User Equipment (UE)) a challenge. One way to save power can include power saving by configuring a Discontinuous Reception (DRX) of a cellular network connected radio.

In one or more embodiments, traffic (e.g., User Plane (U-Plane) traffic) can be offloaded from the cellular network to a WLAN. Some device traffic (e.g., Control Plane (C-Plane)) can be maintained on the cellular network, such as to keep the device connected to the cellular network. The traffic (e.g., S1 bearer) flow between a base station (e.g., eNodeB) and a Serving GateWay (S-GW) of the cellular network can remain unaffected by the traffic offload and this traffic flow can remain active.

Figure 1:
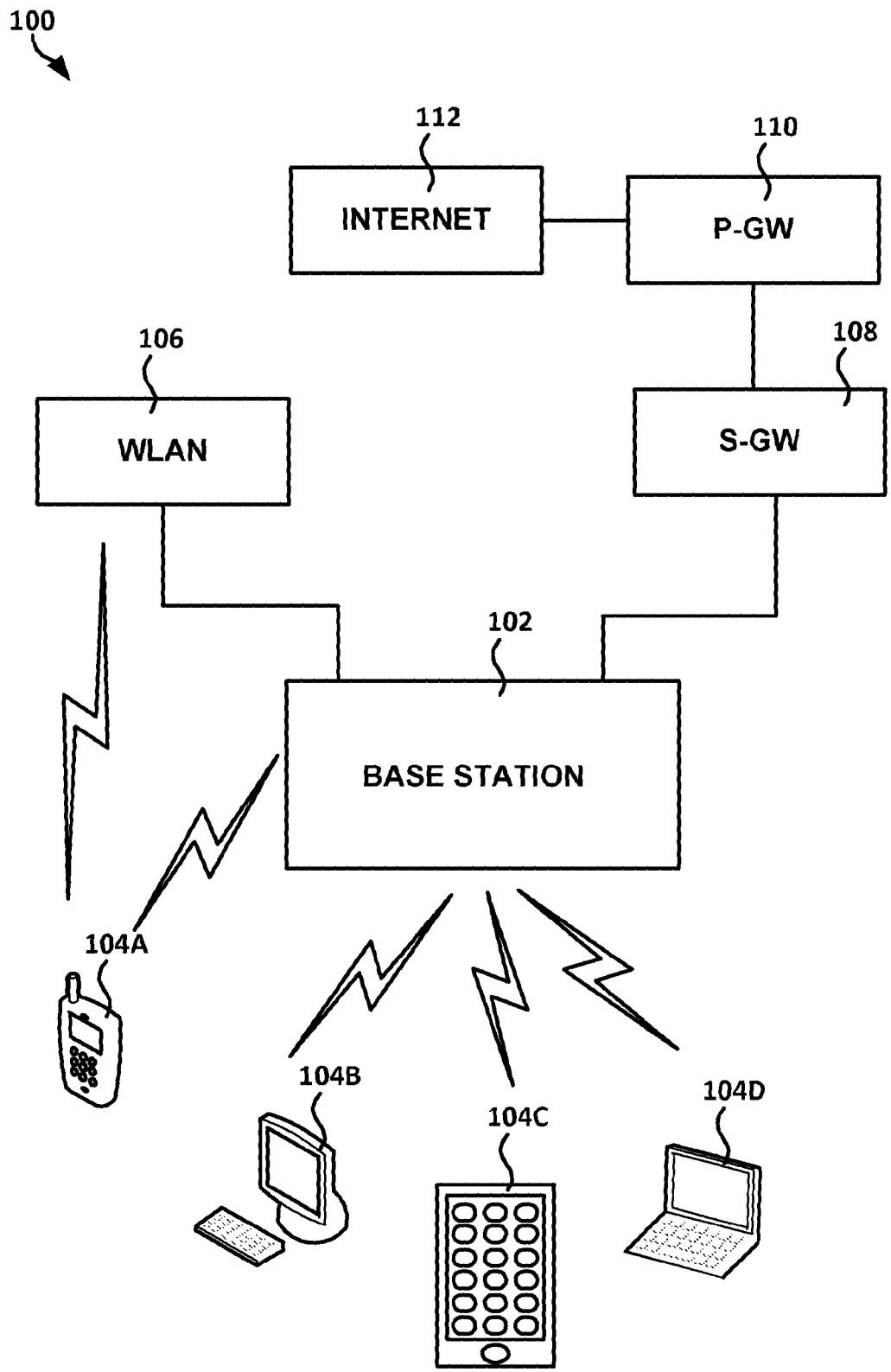
FIG. 1 shows a block diagram of an example of a wireless network in accord with one or more embodiments.

FIG. 1 shows a block diagram of an example of a wireless network in accord with one or more embodiments. The wireless network 100 can include a base station 102, one or more devices 104A, 104B, 104C, or 104D, a WLAN 106, an S-GW 108, a Packet GateWay (P-GW) 110, or an internet 112. The cellular network can be an LTE network. The cellular network can include the base station 102, the S-GW 108, the P-GW 110, or the internet 112. The base station 102 can include an eNodeB. The base station 102 can include a small cell base station. The device 104A-D can include a UE, such as a smart phone, cell phone, tablet, desktop computer, laptop computer, Personal Digital Assistant (PDA) or other device capable of communicating with the WLAN 106 or the base station 102. The WLAN 106 can include a Wireless Fidelity (Wi-Fi) network or access point.

The base station 102 can be integrated with the WLAN 106, such as to create an Integrated Small-cell and WLAN (ISW) network. The base station 102 and the WLAN 106 can be co-located, such as by including the base station 102 and the WLAN 106 in the same box or by positioning the WLAN 106 and base station 102 in close proximity to each other and providing a wired (e.g., Ethernet) connection between the base station 102 and the WLAN 106.

Traffic from the device 104A-D that is being received through the base station 102, can be offloaded to the WLAN 106. U-Plane traffic (e.g., Data Radio Bearer (DRB) traffic) of the device 104A-D can be offloaded to the WLAN, such as by traffic steering. The control traffic (e.g., C-Plane traffic or signaling traffic) of the device 104A-D can remain on the cellular network link, such as between the base station 102 and the device 104A-D. The base station 102 can communicate with the S-GW over an interface, such as an S1 interface. Thus, although there may be no device U-Plane traffic activities over the cellular link between the base station 102 and the device 104A-D, the U-Plane traffic between the base station 102 and the S-GW 108 can remain active, such that the device 104A-D can stay in a connected mode (e.g., "RRC Connected") and the S1 bearers can remain active.

Figure 3:
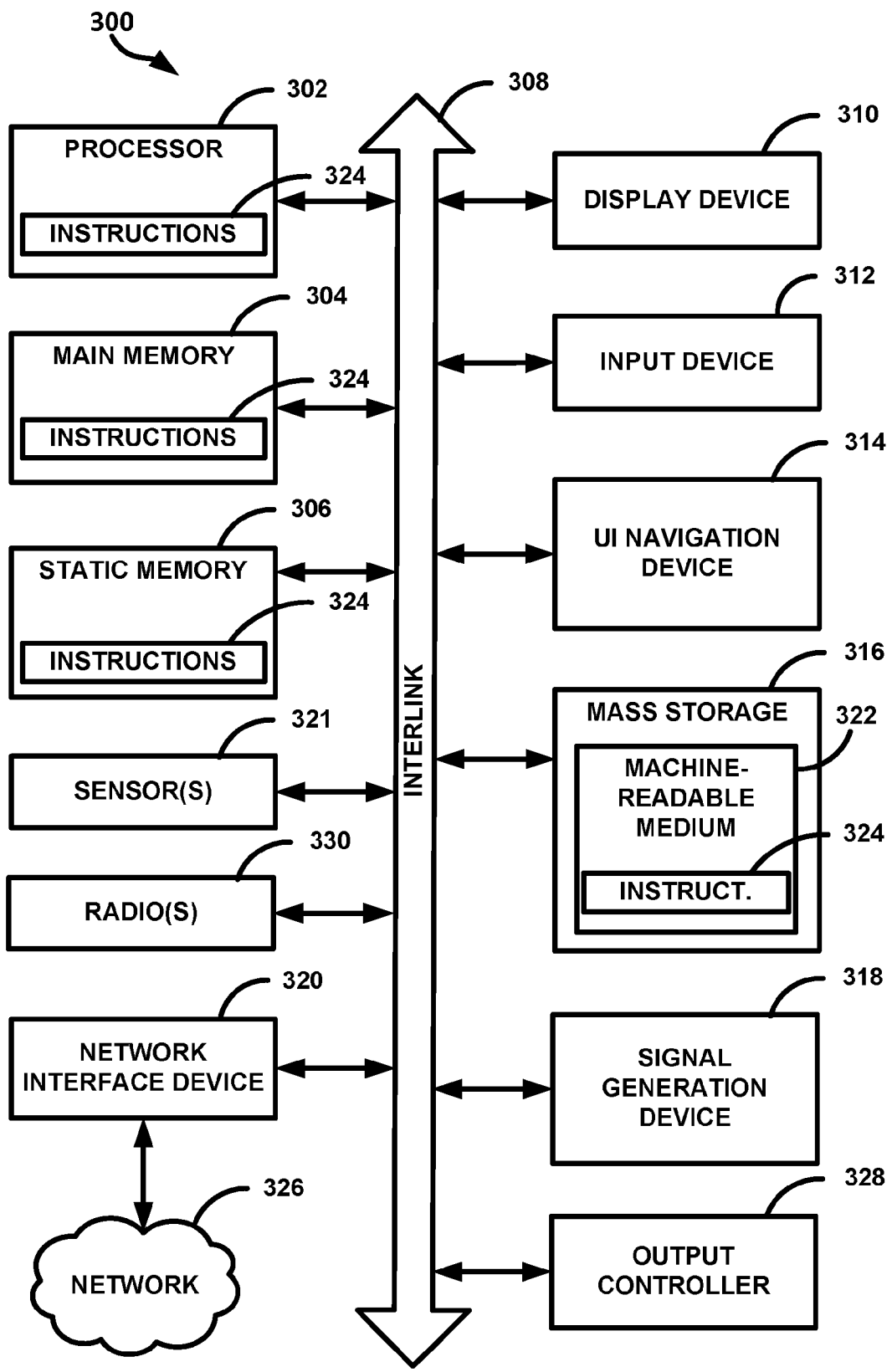
FIG. 3 shows a block diagram of an example of a wireless device in accord with one or more embodiments.

The base station 102 can configure a DRX cycle of a radio (e.g., a radio(s) 330 in FIG. 3) of the device 104A-D, such as by sending a control packet to the device 104A-D. In one or more embodiments, the DRX cycle can be configured to be a maximum allowable value, such as to increase an amount of time between instances of the device 104A-D monitoring the Physical Downlink Control Channel (PDCCH) (e.g., Enhanced PDCCH (EPDCCH)). The DRX cycle time can be in seconds. By increasing the amount of time between monitoring the PDCCH or the EPDCCH the device 104A-D can save power.

The communication link between the device 104A-D and the WLAN 106 can operate on an unlicensed spectrum, and the link can become unavailable at any time, such as to create a WLAN radio lank failure. To provide nearly continuous or uninterrupted service to the device 104A-D, the U-Plane traffic can be moved back to the base station 102. It can be problematic if the WLAN 106 and device 104A-D communication link failure happens during a DRX sleep cycle of a radio of the device 104A-D (e.g., when the device 104A-D is not monitoring the PDCCH).

As mentioned previously, the increased DRX cycle time can achieve a power savings. To maximize power savings, the DRX cycle time should be set to a maximum possible value.

Note that for uplink (UL) traffic, the device 104A-D can wake up even during a radio DRX sleep cycle, thus the DRX cycle time may not impact the delay over the air for UL traffic.

The device 104A-D can send a Scheduling Request (SR) using a dedicated UL control channel in RRC connected state, such as when a periodic resource is allocated to the device 104A-D for the same purpose. In other embodiments, the device 104A-D can start a random access process to send SR which can be time consuming. A frequent UL resource allocation to the device 104A-D, for an SR, can reduce the delay over the air for UL traffic but at the cost of potential wastage of UL resources.

A handover time (e.g., traffic steering) latency for moving U-Plane traffic of a device 104A-D from a WLAN 106 link to a base station 102 link can be reduced. The handover time latency can be reduced by providing the device 104A-D with a periodic or dedicated UL control channel or a dedicated random access code (preamble). The handover latency reduction mechanism can allow for a guarantee of a specified Quality of Service (QoS) requirement in terms of maximum delay over the air, such as for delay sensitive applications including video conference, VoIP, or video game playing, among others. Thus, a mechanism to maximize device 104A-D power saving or limit the maximum delay over the air for the U-Plane WLAN traffic offload, such as in an Integrated Small-cell and ISW Network, can be realized.

In sum, when the device 104A-D has all its traffic offloaded to WLAN, the device can stay connected to the base station, such as in the "RRC-Connected" state, and S1 bearers can remain active. A long DRX cycle can be configured for a cellular network radio of the device 104A-D, such as to increase the power saving. However, such a power saving DRX configuration can keep the device 104A-D sleeping (e.g., not monitoring the PDCCH) for a time before each periodic wake up.

The base station 102 can assign a periodic UL cellular network radio resource to the device 104A-D so that the device 104A-D can send a Scheduling Request (SR) for possible UL traffic and a control message (e.g., a handover command) when WLAN to cellular network handover is triggered, such as during the DRX sleep cycle. Alternatively, the base station 102 can assign a dedicated Random Access (RA) preamble to the device 104A-D so that the device 104A-D can use a random access procedure (e.g., a contention free random access procedure) when WLAN 106 to cellular network (e.g., base station 102) handover is triggered.

The P-GW 110 can provide a device 104A-D with access to external networks, such as by providing an access point for the device 104A-D traffic. The P-GW 110 can provide the device 104A-D with access to data on the internet 112. The P-GW 110 can provide policy enforcement or packet filtering for traffic on a cellular network.

Figure 2:
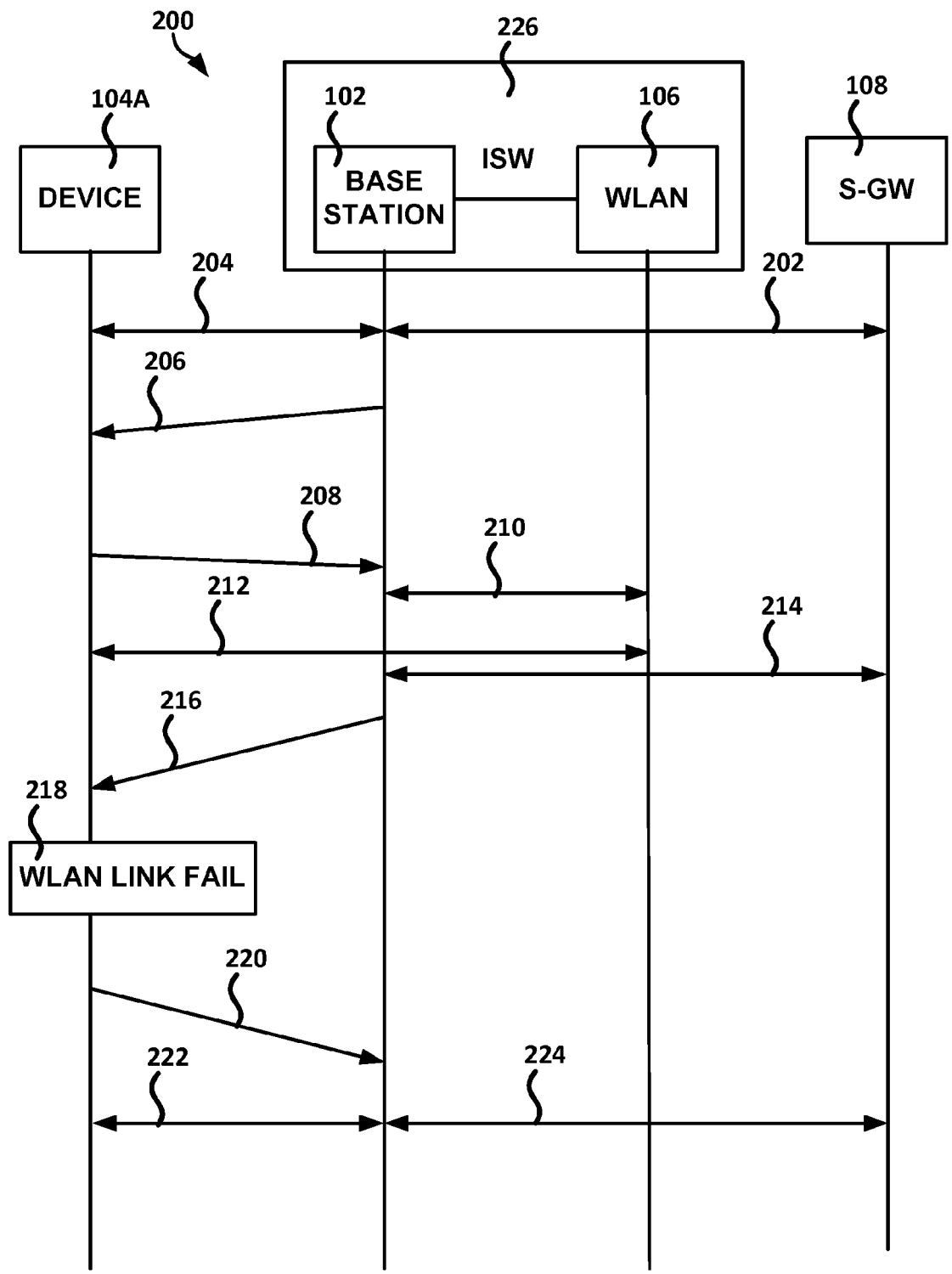
FIG. 2 shows a flow diagram of an example of a technique for traffic offload in accord with one or more embodiments.

FIG. 2 shows an example of a technique 200 for offloading device traffic in accord with one or more embodiments. The technique 200 can include communication between a device 104A and a base station 102, the device 104A and a WLAN 106, or the base station 102 and an S-GW 108. The base station 102 and the WLAN 106 can be co-located or integrated such as to form an ISW 226.

At 202, S1 bearers can be communicated between the base station 102 and the S-GW 108. At 204, U-Plane traffic can be communicated to the device 104A by the base station 102. At 206, the base station 102 can transmit a control packet to the device 104A. The control packet can include an instruction to move U-Plane traffic to the WLAN 106. The control packet can include an RRC Reconfiguration control packet. At 208, the device 104A can transmit an acknowledge packet to the base station 102. The acknowledge packet can be a control packet. The acknowledge packet can indicate whether the device 104A has completed a reconfiguration required to get U-Plane data from the WLAN 106. The device 104A can be coupled to the WLAN at any time prior to the acknowledge packet being sent. The acknowledge packet can include an RRC Reconfiguration Complete control packet.

At 210, U-Plane traffic can be offloaded from the base station 102 to the WLAN 106, such as by routing (e.g., using circuitry such as a digital or analog switch, a bus, or other routing circuitry of the base station 102) the U-Plane data to the WLAN 106. At 212, the WLAN 106 can transmit the offloaded U-Plane data to the device 104A. At 214, S1 bearers can continue to be transmitted (e.g., can remain active) from the S-GW 108. The cellular network radio can stay in a connected state (e.g., a Radio Resource Control (RRC) connected state) rather than transitioning to an idle state (e.g., an RRC-Idle state) because the S1 bearers can remain active.

When the device 104A has all its U-Plane traffic offloaded to the WLAN 106, the base station 102 can configure a cellular network radio of the device 104A in a device power saving state. At 216, a control packet can be transmitted from the base station 102 to the device 104A. The control packet can include an RRC Reconfiguration control packet. The control packet can configure a DRX cycle time of a cellular network radio of the device 104A. The control packet can configure the DRX of the cellular network radio of the device 104A to have a shorter ON duration, no short DRX cycle, or a shorter DRX inactivity timer. Thus, the cellular network radio can include a DRX configured in a power saving (e.g., power optimized) state (e.g., while the cellular network radio is in a connected state). A DRX configuration with longest DRX cycle (2.56 s as per current 3GPP 36.331 spec.), smaller ON duration, no short DRX cycle, or minimal DRX inactivity timer, can help maximize power savings at the device 104A. Such a DRX configuration help can help ensure similar power saving as that in RRC Idle state.

The control packet can include a periodic UL resource allocation for an SR or can include a dedicated RA preamble. Thus, when a WLAN 106 to device 104A link has failed, the UE can use the periodic UL resource allocated to it or can use the dedicated RA preamble to begin receiving U-Plane traffic from the base station 102.

At 218, a link between the WLAN 106 and the device 104A can fail. Note that the link can fail after the control packet at 220 is transmitted. At 220, the device 104A can transmit a control packet to the base station 102. The control packet can include an RRC Reconfiguration Complete control packet. The control packet can indicate that the Reconfiguration indicated in the control packet at 216 is completed. The control packet can include an instruction to move U-Plane traffic to the cellular network, such as to move the U-Plane traffic to the base station 102.

Assigning a periodic UL resource for SR request or a dedicated RA preamble can help reduce an initial channel access delay in case of triggering a WLAN 106 to cellular network (e.g., base station 102) handover. Such an embodiment can help avoid a time consuming, contention-based RA process that can be prevalent in a WLAN to cellular network handover.

The periodicity of a periodic UL resource allocation can be determined by a QoS requirement of active EPS bearers. For example, if the maximum tolerable delay over the air is 150 ms, as determined by the active EPS bearers, the periodicity of UL resource allocation can be less than 150 ms.

The overhead due to periodic UL resource allocation for SR can be justifiable when compared to UL resources needed for data transmissions without WLAN offload. The base station 102 can cancel a periodic UL allocation in response to the base station 102 detecting that the corresponding traffic flow has ended.

In case of WLAN link failure (i.e. WLAN to cellular handover required), the device 104A can send an SR (e.g., immediately). The base station 102 can interpret receipt of this SR as a WLAN to cellular network handover trigger and can allocate a cellular network radio resource to continue the device's 104A traffic sessions.

Alternatively, a Medium Access Control (MAC) Control Element (CE) can be defined to indicate a WLAN to cellular network handover. Such a MAC CE can be included in an SR message to inform the base station 102 of the WLAN link failure. An RRC message with an Information Element (IE) indicating WLAN link failure can also be defined and used for the same purpose as the MAC CE.

At 222, U-Plane traffic can be received at the device 104A. The U-Plane traffic can be transmitted by the base station 102. At 224, the S1 bearers can be transmitted from the S-GW 108 to the base station 102. After the device's traffic is steered back to the cellular network link, the base station 102 may modify the DRX configuration of the cellular network radio of the device 104A to a default, normal, or previous configuration.

FIG. 3 illustrates a block diagram of an example of a wired or wireless device 300 in accord with one or more embodiments. The device 300 (e.g., a machine) can operate so as to perform one or more of the techniques (e.g., methodologies) discussed herein. In alternative embodiments, the device 300 may operate as a standalone device or may be connected (e.g., networked) to other machines, such as the base station 102, the device 104A-D, the WLAN 106, or the S-GW 108. The device 300 can be a part of the base station 102, the device 104A-D, the WLAN 106, or the S-GW 108, as discussed herein. In a networked deployment, the device 300 may operate in the capacity of a server machine, a client machine, or both in server-client network environments. In an example, the device 300 may act as a peer machine in peer-to-peer (P2P) (or other distributed) network environment. The device 300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Device (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The device 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The device 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The device 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 300 may include one or more radios 330 (e.g., transmission, reception, or transceiver devices). The radios 330 can include one or more antennas to receive signal transmissions. The radios 330 can be coupled to or include the processor 302. The processor 302 can cause the radios 330 to perform one or more transmit or receive operations. Coupling the radios 330 to such a processor can be considered configuring the radio 330 to perform such operations. The radio 330 can be a cellular network radio configured to communicate to a base station or other component of a cellular network.

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the device 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the device 300 and that cause the device 300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EE- PROM)) and flash memory devices; magnetic disks, such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 300, and includes digital or analog communications signals or other intangible medium to facilitate communication of such software.

Examples and Notes

The present subject matter may be described by way of several examples.

Example 1 can include or use subject matter (such as an apparatus, a method, a means for performing acts, or a device readable memory including instructions that, when performed by the device, can cause the device to perform acts), such as can include or use a base station (e.g., an eNodeB) including a transceiver configured to (1) transmit, to a device (e.g., a UE), a first control packet to move U-Plane traffic of the device to a WLAN, (2) receive, from the device, a second control packet acknowledging that the U-Plane traffic of the device is to be moved to the WLAN, or (3) transmit C-Plane traffic to the device while no U-Plane traffic of the device is being transmitted to the device by the base station. The base station of Example 1 can include circuitry configured to route U-Plane traffic of the device to the WLAN in response to the transceiver receiving the second control packet.

Example 2 can include or use, or can optionally be combined with the subject matter of Example 1, to include or use wherein the transceiver is further configured to transmit, to the device, a third control packet to set a DRX cycle time of the radio of the device to a maximum value.

Example 3 can include or use, or can optionally be combined with the subject matter of Example 2, to include or use wherein the third control packet disables a DRX short cycle of the radio of the device or set a DRX inactivity time of the radio of the device to a minimal value.

Example 4 can include or use, or can optionally be combined with the subject matter of at least one of Examples 1-3, to include or use, wherein the base station is configured to assign a periodic UL control channel to the device, the transceiver is further configured to receive, from the device, an SR packet indicating that a WLAN link has failed, or the circuitry is configured to route the U-Plane traffic of the device to a cellular network radio resource allocated by the base station, in response to receiving the SR packet.

Example 5 can include or use, or can optionally be combined with the subject matter of Example 4, to include or use, wherein a periodicity of the periodic UL control channel is less than or equal to a maximum delay defined by a quality of service requirement of an active EPS bearer.

Example 6 can include or use, or can optionally be combined with the subject matter of at least one of Examples 1-5, to include or use, wherein the base station is configured to assign a dedicated random access preamble to the device, or wherein the transceiver is further configured to receive, from the device, an SR packet indicating that a WLAN link between the WLAN and the device has failed, or the circuitry is configured to route the U-Plane traffic of the device to a cellular network radio resource allocated by the base station, in response to receiving the SR packet.

Example 7 can include or use, or can optionally be combined with the subject matter of at least one of Examples 1-6, to include or use, wherein the base station and an Access Point (AP) of the WLAN are co-located.

Example 8 can include or use, or can optionally be combined with the subject matter of at least one of Examples 1-7, to include or use, wherein the transceiver is further configured to receive, from the device, an SR including a MAC CE that indicates a WLAN link between the WLAN and the device has failed.

Example 9 can include or use, or can optionally be combined with the subject matter of at least one of Examples 1-8, to include or use, wherein the transceiver is further configured to receive, from the device, an RRC message that includes an Information Element (IE) that indicates a WLAN link between the WLAN and the device has failed.

Example 10 can include or use subject matter (such as an apparatus, a method, a means for performing acts, or a device readable memory including instructions that, when performed by the device, can cause the device to perform acts), such as can include or use (1) transmitting, to a device (e.g., a UE), a first control packet requesting to move U-Plane traffic of the device to a WLAN, (2) receiving, from the device, a second control packet acknowledging that the U-Plane traffic of the device is to be moved to the WLAN, or (3) transmitting C-Plane traffic to the device while no U-Plane traffic of the device is being transmitted to the device by a base station.

Example 11 can include or use, or can optionally be combined with the subject matter of Example 10, to include or use routing U-Plane traffic of the device to the WLAN in response to receiving the second control packet.

Example 12 can include or use, or can optionally be combined with the subject matter of Example 11, to include or use transmitting, to the device, a third control packet to set a DRX cycle time of a cellular network (e.g., LTE) radio of the device to a maximum value.

Example 13 can include or use, or can optionally be combined with the subject matter of Example 12, to include or use, wherein transmitting the third control packet includes transmitting the third control packet to disable a DRX short cycle of the cellular network radio or set a DRX inactivity time of the cellular network radio to a minimal value.

Example 14 can include or use, or can optionally be combined with the subject matter of at least one of Examples 10-13, to include or use (1) assigning a periodic UL control channel to the device, (2) receiving, from the device, an SR packet indicating that a WLAN link to the device has failed, (3) allocating a cellular network radio resource to service the device U-Plane traffic in response to receiving the SR packet, (4) routing the U-Plane traffic of the UE to the allocated radio resource, or (5) transmitting the U-Plane traffic to the UE using the radio resource.

Example 15 can include or use, or can optionally be combined with the subject matter of at least one of Examples 10-14, to include or use, wherein a periodicity of the periodic UL control channel is less than or equal to a maximum delay defined by a quality of service requirement of an active EPS bearer.

Example 16 can include or use, or can optionally be combined with the subject matter of at least one of Examples 10-14, to include or use (1) assigning a dedicated random access preamble to the device, (2) receiving, from the device, an SR packet indicating that a WLAN link between the WLAN and the device has failed, (3) allocating a cellular network radio resource to service device U-Plane traffic in response to receiving the SR packet, (4) routing the U-Plane traffic of the UE to the allocated radio resource, or (5) transmitting the U-Plane traffic to the UE using the radio resource.

Example 17 can include or use, or can optionally be combined with the subject matter of Example 10-16, to include or use receiving, from the device, an SR including a MAC CE that indicates a WLAN link between the WLAN and the device has failed.

Example 18 can include or use, or can optionally be combined with the subject matter of Example 10-16, to include or use receiving, from the device, an RRC message that includes an IE that indicates a WLAN link between the WLAN and the device has failed.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An enhanced Node B (eNodeB) comprising:
a transceiver configured to:
    transmit, to a User Equipment (UE), a first control packet to move User Plane (U-Plane) traffic of the UE to a Wireless Local Area Network (WLAN), and
    receive, from the UE, a second control packet acknowledging that the U-Plane traffic of the UE is to be moved to the WLAN; and
    transmit Control Plane (C-Plane) traffic to the UE while no U-Plane traffic of the UE is being transmitted to the UE by the eNodeB; and
circuitry to route U-Plane traffic of the UE to the WLAN in response to the transceiver receiving the second control packet and assign a periodic UpLink (UL) control channel to the UE, wherein a periodicity of the periodic UL control channel is less than or equal to a maximum delay defined by a quality of service requirement of an active Evolved Packer System (EPS) bearer.

2. The eNodeB of claim 1, wherein the transceiver is further configured to:
transmit, to the UE, a third control packet to set a Discontinuous Reception (DRX) cycle time of the cellular network radio of the UE to a maximum value.

3. The eNodeB of claim 2, wherein the third control packet further disables a DRX short cycle of the cellular network radio or sets a DRX inactivity time of the cellular network radio to a minimal value.

4. The eNodeB of claim 1, wherein:
the transceiver is further configured to receive, from the UE, a Scheduling Request (SR) packet indicating that a WLAN link has failed; and
the circuitry is configured to route the U-Plane traffic of the UE to an LTE radio resource allocated by the eNodeB, in response to receiving the SR packet.

5. The eNodeB of claim 1, wherein the eNodeB is configured to assign a dedicated random access preamble to the UE;
the transceiver is further configured to receive, from the UE, a Scheduling Request (SR) packet indicating that a WLAN link between the WLAN and the UE has failed; and the circuitry is configured to route the U-Plane traffic of the UE to an LTE radio resource allocated by the eNodeB, in response to receiving the SR packet.

6. The eNodeB of claim 1, wherein the eNodeB and an Access Point (AP) of the WLAN are co-located.

7. The eNodeB of claim 1, wherein the transceiver is further configured to receive, from the UE, a Scheduling Request (SR) packet including a Medium Access Control (MAC) Control Element (CE) that indicates a WLAN link between the WLAN and the UE has failed.

8. The eNodeB of claim 1, wherein the transceiver is further configured to receive, from the UE, an RRC message that includes an Information Element (IE) that indicates a WLAN link between the WLAN and the UE has failed.

9. A method comprising:
   transmitting, to a User Equipment (UE), a first control packet to move User Plane (U-Plane) traffic of the UE to a Wireless Local Area Network (WLAN);
   receiving, from the UE, a second control packet acknowledging that the U-Plane traffic of the UE is to be moved to the WLAN;
   transmitting Control Plane (C-Plane) traffic to the UE while no U-Plane traffic of the UE is being transmitted to the UE by a base station; and
   routing U-Plane traffic of the UE to the WLAN in response to receiving the second control packet;
   assigning a periodic UpLink (UL) control channel to the UE, wherein a periodicity of the periodic UL control channel is less than or equal to a maximum delay defined by a quality of service requirement of an active Evolved Packer System (EPS) bearer; and
   transmitting, to the UE, a third control packet to set a Discontinuous Reception (DRX) cycle time of an LTE radio of the UE to a maximum value.

10. The method of claim 9, wherein transmitting the third control packet includes transmitting the third control packet to disable a DRX short cycle of the LTE radio or set a DRX inactivity time of the LTE radio to a minimal value.

11. The method of claim 9, further comprising
   receiving, from the UE, a Scheduling Request (SR) packet indicating that a WLAN link to the UE has failed;
   allocating an LTE radio resource to service UE U-Plane traffic in response to receiving the SR packet;
   routing the U-Plane traffic of the UE to the allocated radio resource; and
   transmitting the U-Plane traffic to the UE using the radio resource.

12. The method of claim 11, further comprising:
   assigning a dedicated random access preamble to the UE;
   receiving, from the UE, a Scheduling Request (SR) packet indicating that a WLAN link between the WLAN and the UE has failed; and
   allocating an LTE radio resource to service UE U-Plane traffic in response to receiving the SR packet;
   routing the U-Plane traffic of the UE to the allocated radio resource; and
   transmitting the U-Plane traffic to the UE using the radio resource.

13. The method of claim 9, further comprising receiving, from the UE, a Scheduling Request (SR) including a Medium Access Control (MAC) Control Element (CE) that indicates a WLAN link between the WLAN and the UE has failed.

14. The method of claim 9, further comprising receiving, from the UE, an RRC message that includes an Information Element (IE) that indicates a WLAN link between the WLAN and the UE has failed.

15. A non-transitory computer readable storage device including instructions stored thereon, the instructions, which when executed by a machine, cause the machine to perform operations comprising:
   transmitting, to a User Equipment (UE), a first control packet to move User Plane (U-Plane) traffic of the UE to a Wireless Local Area Network (WLAN);
   receiving, from the UE, a second control packet acknowledging that the U-Plane traffic of the UE is to be moved to the WLAN;
   assigning a periodic UpLink (UL) control channel to the UE, wherein a periodicity of the periodic UL control channel is less than or equal to a maximum delay defined by a quality of service requirement of an active Evolved Packer System (EPS) bearer; and
   transmitting Control Plane (C-Plane) traffic to the UE while no U-Plane traffic of the UE is being transmitted to the UE by the transceiver.

16. The storage device of claim 15, further comprising instructions, which when executed by the machine, cause the machine to perform operations comprising routing U-Plane traffic of the UE to the WLAN in response to the transceiver receiving the second control packet.

17. The storage device of claim 16, further comprising instructions, which when executed by the machine, cause the machine to perform operations comprising transmitting, to the UE, a third control packet to set a Discontinuous Reception (DRX) cycle time of an LTE radio of the UE to a maximum value.

18. The storage device of claim 17, wherein the instructions for transmitting the third control packet include instructions, which when executed by the machine, cause the machine to perform operations comprising transmitting the third control packet to disable a DRX short cycle of the LTE radio or set a DRX inactivity time of the LTE radio to a minimal value.

* * * * *